US008666633B2

(12) United States Patent
Ertz et al.

(10) Patent No.: US 8,666,633 B2
(45) Date of Patent: Mar. 4, 2014

(54) ENGINE SYSTEMS WITH EFFICIENT START CONTROL LOGIC

(75) Inventors: Timothy Ertz, Scottsdale, AZ (US); Thomas Nesdill, Scottsdale, AZ (US); Mike Baron, Phoenix, AZ (US); Paul Otto, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/367,864

(22) Filed: Feb. 7, 2012

(65) Prior Publication Data

US 2013/0204506 A1 Aug. 8, 2013

(51) Int. Cl.
*G06F 19/00* (2011.01)
*F02C 7/36* (2006.01)

(52) U.S. Cl.
USPC .......... 701/100; 477/30

(58) Field of Classification Search
USPC .......... 701/100, 108, 110; 60/239, 285, 778; 477/30
See application file for complete search history.

(56) References Cited

U.S. PATENT DOCUMENTS

| | | | | |
|---|---|---|---|---|
| 4,868,754 | A | 9/1989 | Matsumoto | |
| 5,123,239 | A | 6/1992 | Rodgers | |
| 5,752,383 | A * | 5/1998 | Rominek | 60/407 |
| 6,035,626 | A | 3/2000 | Wahl et al. | |
| 6,810,676 | B2 | 11/2004 | O'Connor | |
| 6,836,086 | B1 | 12/2004 | Goldberg et al. | |
| 7,204,090 | B2 | 4/2007 | O'Connor | |
| 7,448,220 | B2 | 11/2008 | Schmidt et al. | |
| 7,690,205 | B2 | 4/2010 | Delaloye et al. | |
| 7,840,333 | B2 | 11/2010 | Mehrer et al. | |
| 2003/0056521 | A1 * | 3/2003 | Dewis | 60/778 |
| 2007/0132245 | A1 * | 6/2007 | Duesterhoeft | 290/27 |
| 2011/0259016 | A1 * | 10/2011 | Winston et al. | 60/778 |

* cited by examiner

*Primary Examiner* — Mary Cheung
(74) *Attorney, Agent, or Firm* — Ingrassia Fisher & Lorenz, P.C.

(57) ABSTRACT

An engine system for starting a gas turbine engine is provided. The system includes a starter generator coupled to the gas turbine engine and configured to provide torque to the gas turbine engine and a controller coupled to the starter generator and configured to provide a command signal to the starter generator. The starter generator provides the torque to the gas turbine engine based on the command signal, and the controller is configured to command the starter generator at a dwell speed until ignition.

17 Claims, 3 Drawing Sheets

ENGINE SYSTEMS WITH EFFICIENT START CONTROL LOGIC

TECHNICAL FIELD

The present invention generally relates to gas turbine engines, and more specifically to engine systems and methods for controlling the gas turbine engines during start-up.

BACKGROUND

In many aircraft, gas turbine engines perform a number of functions, including providing propulsion for the aircraft and driving various other rotating components such as, for example, generators, compressors, and pumps, to thereby supply electrical and/or pneumatic power. Such engines may include auxiliary power units (APU) that supplement main propulsion engines by providing electrical and/or pneumatic power.

A gas turbine engine typically includes a compressor section, a combustion section, and a turbine section. The compressor section compresses air provided at a forward end of the gas turbine engine and provides the compressed air to the compressor stage. Fuel is added to the compressed air, and the resulting mixture is ignited within the combustion section to produce combustion gases. The combustion gases are directed to the turbine section, which extracts energy from the combustion gases to provide the motive force necessary to power the compressor section, such that the gas turbine engine is self-sustaining.

To start the gas turbine engine, a starter motor may be used to initially provide a motive force to the shaft connecting the compressor section to the turbine section. The starter motor may be used to increase the speed of the compressor section to a point at which the compressed air provided to the combustion section results in a fuel/air mixture that is suitable for ignition (commonly referred to as "light-off"). Typically, light-off occurs at approximately 10-20% of the operating speed of the gas turbine engine. Following light-off, the starter motor is discontinued when the gas turbine engine is self-sustaining (i.e., the power generated by the turbine section is sufficient to power the compressor section) such that the gas turbine engine does not require the motive force from the starter motor.

There are a number of issues with the engine systems that control the start-up and operation of the gas turbine engines. For example, the fuel and air must be at a particular ratio to achieve ignition. Since the speeds of the engine, and thus the compressor, are accelerating during start-up, the margin of error for introducing the appropriate amount of fuel is small. Unburned fuel reduces the efficiency of the engine and increases undesirable emissions. Other aspects of engine operation may result in less than optimal fuel consumption.

Accordingly, it is desirable to provide engine systems that operate a gas turbine engine in a more efficient manner. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an engine system for starting a gas turbine engine is provided. The system includes a starter generator coupled to the gas turbine engine and configured to provide torque to the gas turbine engine and a controller coupled to the starter generator and configured to provide a command signal to the starter generator. The starter generator provides the torque to the gas turbine engine based on the command signal, and the controller is configured to command the starter generator at a dwell speed until ignition.

In accordance with another exemplary embodiment, an engine system for starting a gas turbine engine is provided. The system includes a power source configured to provide electrical power and a starter generator coupled to the gas turbine engine and the power source. The starter generator is configured convert the electrical power from the power source to mechanical power and to provide the mechanical power as torque to the gas turbine engine. A controller is configured to determine a level of electrical power associated with the power source. The controller is coupled to the starter generator and configured to provide a command signal to the starter generator based on the level of electrical power. The starter generator provides the torque to the gas turbine engine based on the command signal.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide engine systems of gas turbine engines. Particularly, the engine system is directed to starting the engine in a more efficient manner. The engine system includes a starter generator that drives the engine as fuel is introduced into compressed air and ignited. An engine controller may direct the starter generator to run at a dwell speed for an optimal light-off window. Additionally, the starter generator may continue to operate after light-off and after the engine has reached a self-sustaining speed to assist the engine such that the amount of fuel consumed by the engine is reduced.

Figure 1:
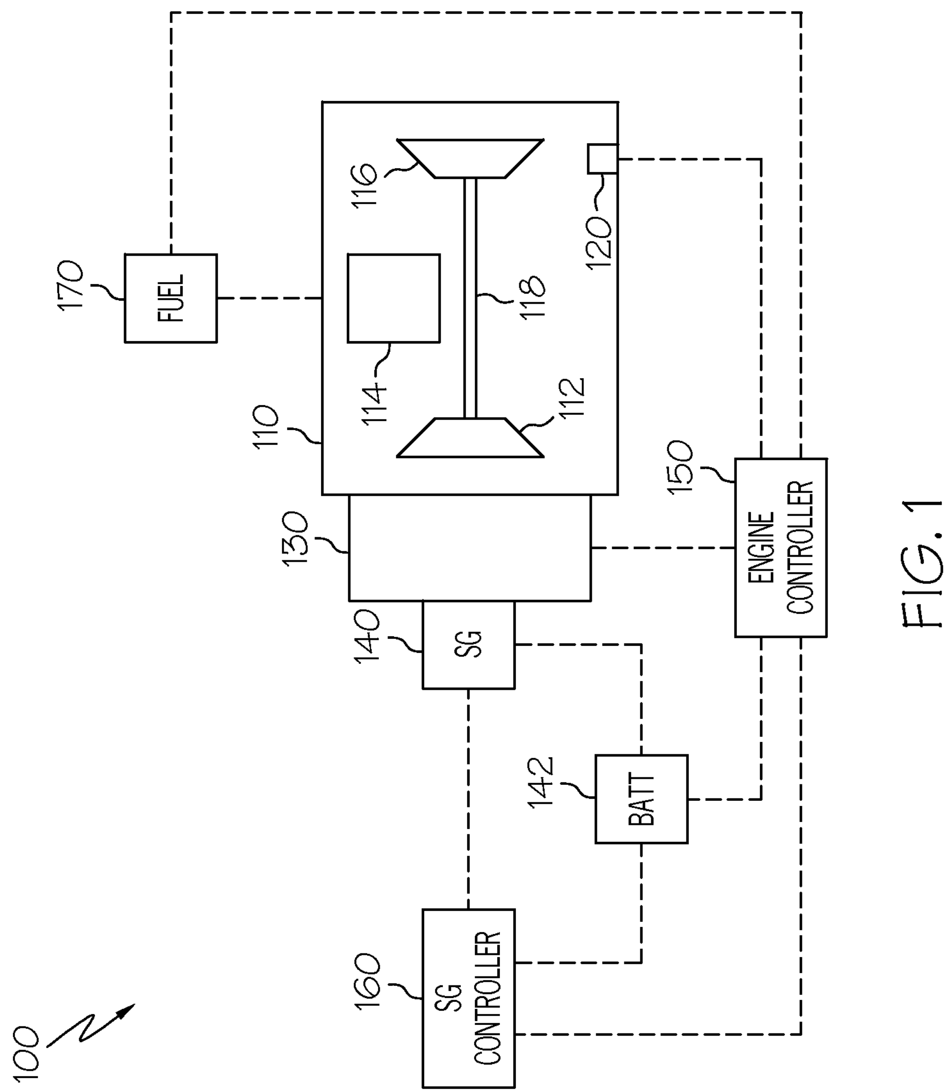
FIG. 1 is a schematic block diagram of an engine system in accordance with an exemplary embodiment.

FIG. 1 is a schematic representation of an exemplary aircraft engine system 100. The engine system 100 generally includes a gas turbine engine 110, a gearbox 130, a starter generator 140, an engine controller 150, a starter generator controller 160, and a fuel system 170.

Typically, the engine 110 includes a compressor section 112, a combustion section 114, a turbine section 116, and a spool or shaft 118. During a typical running operation, the compressor section 112 draws in ambient air, compresses it, and directs it into a combustion section 114. The combustion section 114 receives the compressed air, mixes it with fuel from the fuel system 170, and combusts the resulting mixture to generate high energy combustion gases, which are directed into the turbine section 116. The high energy combustion gases expand through the turbine section 116, which in turn, drives the shaft 118 to produce mechanical power and/or electrical power. The gearbox 130 is coupled to the shaft 118 and provides or receives the mechanical energy from the shaft 118, various accessories, and as described below, the starter generator 140. The combustor gases may be exhausted through an exhaust system (not shown). The schematic representation in FIG. 1 is merely one exemplary engine configuration, and the exemplary embodiments discussed herein are applicable to other types of configurations.

The engine 110 may be, for example, an auxiliary power unit (APU), although the engine system 100 described herein is also applicable to other types of engines, including propulsion engines. As described below, the engine 110 may further include any number of sensors for measuring engine characteristics, including a temperature sensor 120 for measuring the temperature of the gases exhausted from the turbine section 116.

As noted above, the fuel system 170 is configured to deliver a flow of fuel to the combustion section 114 of the engine 110. As such, the fuel system 170 may include a tank or other source of fuel, valves, pumps, nozzles, and the like for providing a designated volume and rate of fuel.

The engine controller 150 generally controls the overall operation of the engine 110 as well as the fuel system 170. More specifically, the engine controller 150 receives signals from various sensors and systems and, in response to these signals, controls the engine 110 during start-up, operation, and shut-down modes. Included among the signals supplied to the engine controller 150 are an exhaust gas temperature (EGT) signal, which is supplied from the temperature sensor 120; a rotational speed signal, which is supplied from a speed sensor in the gearbox 130 and/or engine 110; and/or a fuel flow signal from the fuel system 170. The engine controller 150 may also receive external sensor signals from other sources, including signals such as the altitude of the aircraft and the ambient temperature. In response to these signals, the engine controller 150 provides command signals to various components, including to the starter generator controller 160, the engine 110, and the fuel system 170 to maintain efficient operation. Additional details of the engine controller 150 will be discussed below after a brief description of the other components of the engine system 100.

The starter generator 140 is coupled to the engine 110 through the gearbox 130. The starter generator 140 receives electrical power from an external power source 142, such as a battery or other AC or DC power source, which may or may not be considered part of the starter generator 140. In one exemplary embodiment, the starter generator 140 is an AC induction motor, a switched reluctance motor, or a brushless DC motor coupled through the gearbox 130 to provide torque to the engine 110 or to receive torque from the engine 110, e.g., to provide torque to the compressor rotor or to receive torque from the turbine rotor. As such, the starter generator 140 is configured to operate in either a generator mode or a motor mode. In the generator mode, rotational mechanical energy is supplied to the starter generator 140, and the starter generator 140 converts the rotational energy to electrical energy. Conversely, in the motor mode, electrical energy is supplied to the starter generator 140, and the starter generator 140 converts the electrical energy to rotational mechanical energy. In the description below of the start-up operation, the starter generator 140 is typically providing torque to the engine 110 in the motor mode.

The starter generator controller 160 generally controls the overall operation of the starter generator 140. In one exemplary embodiment, the starter generator controller 160 controls the starter generator 140 based on signals from the engine controller 150. Although depicted as separate in FIG. 1, the engine controller 150 and starter generator controller 160 may be incorporated into a single controller.

In addition to coupling the starter generator 140 to the engine 110, the gearbox 130 may also drive mechanical accessories such as tachometers, generators or alternators, hydraulic pumps, fuel pumps, oil pumps, fuel controls, and water pumps with power from the engine 110 or starter generator 140. The gearbox 130 may include any number of gears, shafts, and clutches for transferring energy between the engine 110, starter generator 140, and the other accessories. As an example, the gearbox 130 may provide mechanical power to the fuel system 170.

The manner in which the engine controller 150 operates to control the engine 110 during start-up, operation, and shutdown may vary. When the engine controller 150 is controlling the engine 110 in the start-up mode, the engine controller 150 implements control logic stored in memory. In particular, and as will be described in more detail, the engine controller 150 provides a command signal to the starter generator controller 160 to operate the starter generator 140 according to the control logic. The controllers 150 and 160 communicate with one another and the other components over a communication bus or the like.

Additional details about the start-up operation will be provided below, but generally, in one exemplary embodiment, the engine controller 150 initiates starting the engine 110 by commanding the starter generator 140, via the starter generator controller 160, to drive the engine 110. As the shaft 118 rotates, air is inducted into the compressor section 112, compressed, and then discharged into the combustion section 114. The starter generator 140 is accelerated according to a predetermined schedule until reaching a dwell speed, at which time the starter generator 140 is held generally constant. Upon reaching a relatively constant dwell speed, the engine controller 150 provides a command signal to the fuel system 170 to introduce the appropriate amount of fuel for ignition and "light-off" The dwell speed is generally considered the speed at which the engine 110 is introducing an amount of air suitable for an optimal air to fuel ratio. In one exemplary embodiment, the dwell speed is approximately 7%-25% of engine operating speed. Since the dwell speed is known, the timing and amount of fuel provided by the fuel system 170 are optimized for light-off. As a result, the amount of unburned fuel (e.g., fuel unnecessarily introduced prior to favorable light-off conditions) is reduced, thereby reducing emissions and increasing fuel efficiency. In one exemplary embodiment, the amount of fuel provided to the engine 110 may be dithered around the dwell speed to ensure light-off.

The engine controller 150 continues to provide command signals to the starter generator controller 160 to continue operating the starter generator 140 to assist the engine 110 during operation until a self-sustaining speed and beyond based on the speed of the engine 110 and the battery level of the power source 142 associated with the starter generator 140. Upon reaching designated level of battery level and/or engine speed, the engine controller 150 may command the starter generator controller 160 to shut off the starter generator 140. In one exemplary embodiment, the self-sustaining speed is about 50-60% of engine operating speed and the starter generator 140 may continue to assist the engine 110 until about 80-90% of engine operating speed. After shutting off the starter generator 140, the engine 110 may continue to accelerate to 100% of operating speed. At times, the continued operation of the starter generator 140 beyond the self-sustaining speed of the engine 110 reduces the amount of burned fuel in favor of increased use of the electrical energy of the battery or other external power source 142. Depending on the relative levels of available energy and the monetary and emission costs associated therewith, this distribution may be optimized as necessary or desired. Additional details about the start schedule of the starter generator 140 are provided below.

Figure 2:
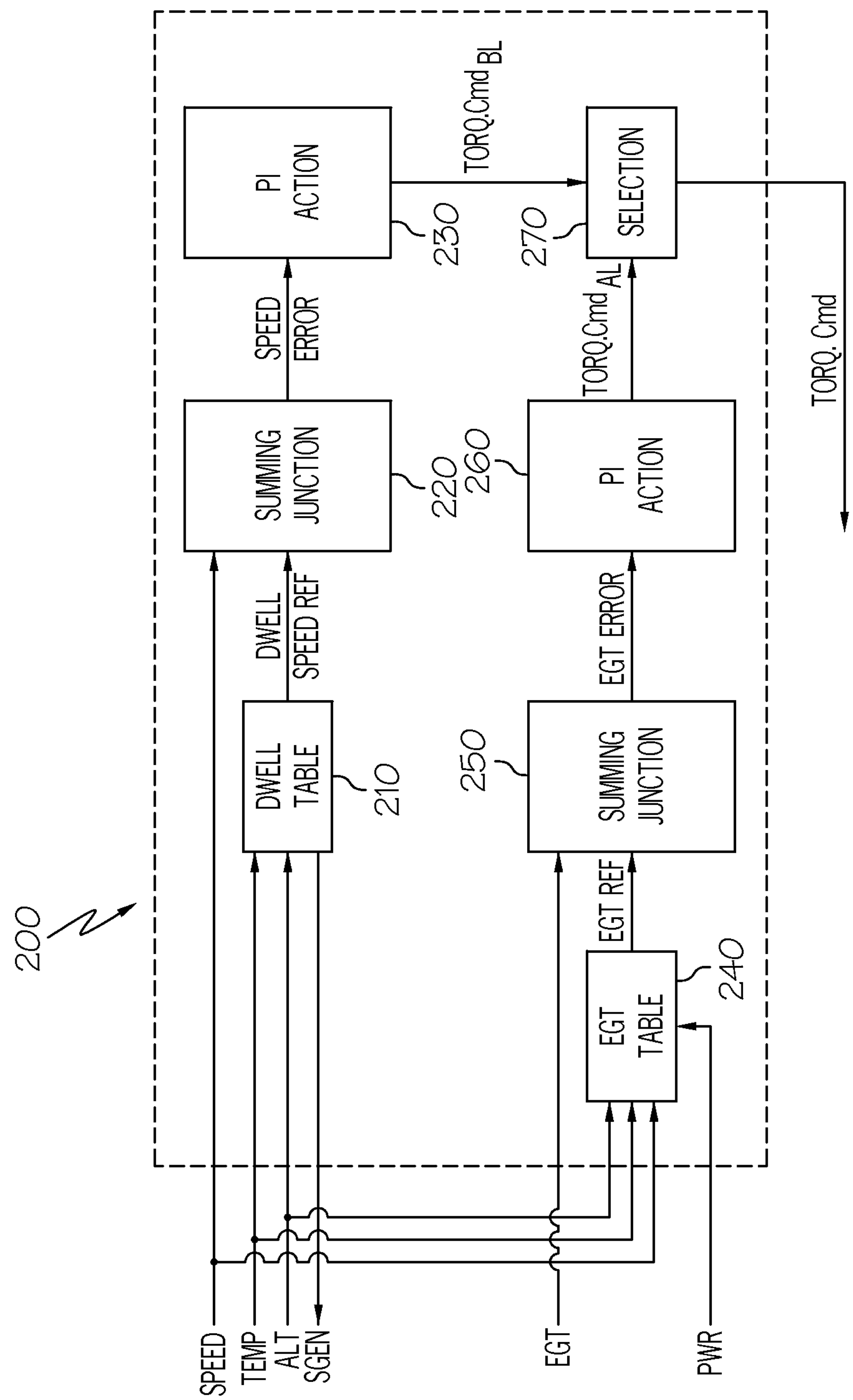
FIG. 2 is a schematic block diagram of start control logic of the engine system of FIG. 1 in accordance with an exemplary embodiment.

FIG. 2 is a schematic block diagram of start control logic 200 of the engine system 100 of FIG. 1 in accordance with an exemplary embodiment and will be used to describe the operation of the engine system 100 in more detail. In one exemplary embodiment, the start control logic 200 is implemented on the engine controller 150, although in other embodiments, all or part of the start control logic 200 may be distributed on other components.

As described in greater detail below, the start control logic 200 may include a dwell table 210, a first summing junction module 220, a first proportional integral (PI) action module 230, an exhaust gas temperature (EGT) curve table 240, a second summing junction module 250, a second PI action module 260, and a selection module 270. In general, the start control logic 200 generates a torque command for the starter generator controller 160. In one exemplary embodiment, the start control logic 200 provides the torque command in two scenarios: a torque command prior to light-off (e.g., "Torq.C-$md_{BL}$"); and a torque command after light-off (e.g., "Torq.C-$md_{AL}$"). As described below, the dwell table 210, the first summing junction module 220, and the first PI action module 230 generate the torque command prior to light-off, and the EGT curve table 240, the second summing junction module 250, the second PI action module 260 generate the torque command after light-off. The start control logic 200 may interact with other components of the engine system 100 (FIG. 1). As such, FIG. 1 is additionally referenced below.

The start control logic 200 initially receives ambient temperature data and altitude data at the dwell table 210. The ambient temperature and altitude data may be provided by external sensors or systems (not shown). The dwell table produces a signal representing a target dwell speed for the starter generator 140 to drive the engine 110 based on the conditions indicated by the temperature and altitude.

The target dwell speed signal is provided to the first summing junction module 220, which additionally receives a signal representing the actual or measured speed of the starter generator 140 or engine 110. The measured speed may be provided by sensors in the gearbox 130 or elsewhere.

The first summing junction module 220 generates a signal representing the error (difference) between the reference (or target) dwell speed and the measured speed. The speed error signal is provided to the first PI action module 230. The first PI action module 230 generates a command for the starter generator controller 160 that represents adjustments in the torque generated by the starter generator 140 to achieve the target dwell speed. The torque adjustment command is provided to the selection module 270. As noted above, this torque adjust command (Torq.$Cmd_{BL}$) is the torque command prior to light-off, as described below.

Reference is now made to the EGT curve table 240, which receives the speed, the ambient temperature, and the altitude referenced above. The EGT curve table 240 further receives an indication about the level of electrical power available to the starter generator 140 (FIG. 1). The level of available electrical power may be derived from other information, such as temperature, or measured directly, such as with a voltage meter.

The EGT curve table 240 determines an expected Exhaust Gas Temperature (EGT) setpoint (or reference) ($EGT_{REF}$) that the control drives to set the output of system on engine measured EGT value that is to be controlled to the speed, ambient temperature, altitude, and electrical power. For example, the EGT curve table may be a 3D look up table with the inputs of speed, ambient temperature, altitude, and electrical power. Additional details about the start schedule resulting from the EGT curve table 240 is described in greater detail below.

The reference EGT ($EGT_{REF}$) is provided to the second summing junction module 250, which additionally receives the actual or measured EGT. The measured EGT may be measured by temperature sensor 120 in the engine 110. The second summing junction module 250 compares the measured EGT to the reference EGT ($EGT_{REF}$) and generates an EGT error (or difference), which is provided to the second PI action module 260. The second PI action module 260 generates a torque adjustment command based on the EGT error, which as described above, is the torque adjustment command after light-off (Torq.$Cmd_{AL}$) and is provided to the selection module 270.

The selection module 270 outputs the appropriate torque adjustment command (e.g., Torq.$Cmd_{BL}$ or Torq.$Cmd_{AL}$) based on the measured status of EGT to determine that the combustor has lit off. Based on the torque adjustment command, the starter generator controller 160 controls the starter generator 140 to provide a controlled torque to the engine 110, e.g., the torque adjustment command augments the base starting torque schedules. After light-off, the control logic 200 continues to generate the torque adjustment command (Torq.$Cmd_{AL}$) as described above, e.g., adjusted up or down based on the measured engine parameters, including speed, temperature, and altitude. Additional details about exemplary logic may be found in U.S. Pat. No. 6,035,626, incorporated herein by reference.

Figure 3:
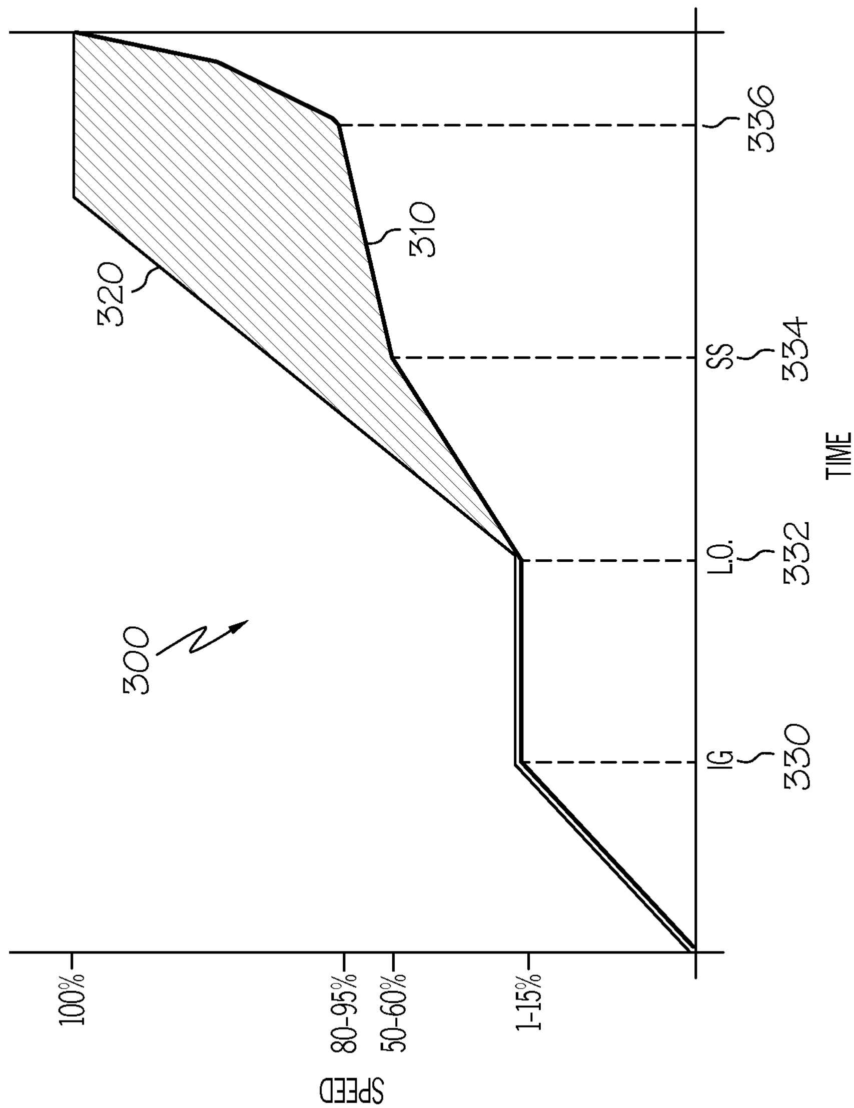
FIG. 3 is an exemplary start schedule produced by the start control logic of FIG. 2 in accordance with an exemplary embodiment.

FIG. 3 is an exemplary start schedule 300 produced by the start control logic 200 of FIG. 2 in accordance with an exemplary embodiment. FIG. 3 particularly illustrates two types of start schedules 310 and 320 provided by the start control logic 200 based on, for example, the various parameters discussed above, including the level of the electrical power available to the starter generator 140. In FIG. 3, time is generally represented on the horizontal axis and engine speed is represented on the vertical axis.

In general, schedule 310 represents the schedule that utilizes the most assistance from the starter generator 140, and schedule 320 represents the schedule that utilizes the least assistance from the starter generator 140. As such, schedule 310 is referenced as the "maximum schedule," and schedule 320 is referenced as the "minimum schedule."

As shown, both schedules 310 and 320 initially require the starter generator 140 to accelerate to a dwell speed for ignition 330, which may correspond to approximately 7-15% of maximum speed, as noted above. At light-off 332, the minimum schedule 310 generally accelerates to minimize the assistance provided by the starter generator 140, for example, when the electrical energy available to the starter generator 140 is low. The minimum schedule 310 continues to accelerate to a time 334 corresponding to a self-sustaining speed, e.g., about 50-60%. After the self-sustaining speed, the starter generator 140 is typically turned off, thereby resulting in little or no assistance from the starter generator 140. At time 336, the minimum schedule 310 achieves a rapid acceleration to 100% of engine speed.

In contrast to the minimum schedule 310, the maximum schedule 320 continues to utilize a greater amount of assistance from the starter generator 140, e.g., typically due to a sufficient amount of electrical power available to the starter generator 140. As such, after light-off, the maximum schedule 320 accelerates at a faster rate than the minimum schedule 310. Additionally, after the self-sustaining speed, the maximum schedule 320 continues to command assistance from the starter generator 140, thereby resulting in a faster acceleration to 100% of engine speed.

As noted above, the engine 110 may be operated by the starter generator 140, by combustion within the engine itself, or a combination thereof. As such, since the maximum schedule 320 uses an increased amount of assistance from the starter generator 140, a corresponding portion of operating energy provided to the engine from fuel burn may be eliminated from the overall energy utilization. Accordingly, the increased use of electrical power enables a reduced use of fuel and a reduced amount of emissions from fuel combustion.

In FIG. 3, the area between the maximum schedule 320 and the minimum schedule generally represents the potential fuel savings between the two schedules. As such, if available, the starter logic 200 discussed above typically utilizes the starter generator 140 to the greatest extent possible or reasonable to reduce fuel consumption and emissions.

The turbine engine start-up system and method may be implemented in wide variety of platforms, such as a computer system that includes a processor, an interface, a storage device, a bus, and a memory that stores the start logic as a program. The processor performs the computation and control functions of the controllers and may include any type of processor, including integrated circuits such as a microprocessor implemented on separate systems or as part of an overall vehicle control, navigation, avionics, communication or diagnostic system. During operation, the processor executes the programs contained within memory, which may be any type of suitable memory. The bus serves to transmit programs, data, status and other information or signals between the various components of engine system and may include any suitable physical or logical mechanisms of connecting computer systems and components.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks, and transmission media such as digital and analog communication links, including wireless communication links.

Exemplary embodiments discussed herein provide improved coordination of the engine speed, ignition, and fuel delivery to achieve a reliable start. Additionally, the control logic provides a more controlled operation of the starter generator and system overall to minimize unburned fuel and thermal transients. The operation of the starter generator may also reduce the amount of consumed fuel as a result of the assistance provided to the engine above the self-sustaining speed. Exemplary embodiments control the torque applied by a starter generator to a gas turbine engine during start-up according to a predetermined acceleration schedule with an optimized distribution between stored electrical energy and mechanical energy produced by combustion. Although the starter generator is described herein as being used with, for example, an aircraft gas turbine engine, it will be appreciated that it may be used as a starter generator with gas turbine engines in numerous other environments including, for example, space, marine, land, or other vehicle-related applications where gas turbine engines are used.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine system for starting a gas turbine engine, comprising:

a starter generator coupled to the gas turbine engine and configured to provide torque to the gas turbine engine;

a controller coupled to the starter generator and configured to provide a command signal to the starter generator, the starter generator providing the torque to the gas turbine engine based on the command signal, the controller configured to command the starter generator at a dwell speed until ignition, wherein the controller is configured to command the starter generator to continue providing the torque to the gas turbine engine beyond a self-sustaining speed; and a power source configured to provide electrical power to the starter generator, wherein the controller is configured to determine a level of electrical power of the power source and to provide the command signal based on the level of electrical power.

2. The engine system of claim 1, wherein the dwell speed is relative constant.

3. The engine system of claim 2, wherein the dwell speed is about 7-25% of engine operating speed.

4. The engine system of claim 1 wherein the self-sustaining speed is about 50-60% of engine operating speed.

5. The engine system of claim 1, wherein the controller is configured to command the starter generator to continue providing the torque to the gas turbine engine until about 80% of engine operating speed.

6. The engine system of claim 1, wherein the controller is configured to command the starter generator to continue providing the torque to the gas turbine engine beyond about 80% of engine operating speed.

7. The engine system of claim 1, wherein the command signal is a first command signal, and wherein the controller is configured to provide a second command signal to a fuel system to introduce fuel into the gas turbine engine when the starter generator reaches the dwell speed.

8. An engine system for starting a gas turbine engine, comprising:

a starter generator coupled to the gas turbine engine and configured to provide torque to the gas turbine engine; and a controller coupled to the starter generator and configured to provide a command signal to the starter generator, the starter generator providing the torque to the gas turbine engine based on the command signal, the controller configured to command the starter generator at a dwell speed until ignition, wherein the controller includes:

a dwell table configured to receive an ambient temperature and an altitude and to generate a target dwell speed signal based on the ambient temperature and the altitude, a first summing junction module coupled to the dwell table and configured to receive the target dwell speed signal from the dwell table and an engine speed signal and to compare the target dwell speed signal and the engine speed signal to generate a speed error signal, and a first proportional integral (PI) action module coupled to the first summing junction module and configured to receive the speed error signal and to generate a first torque adjustment command based on the speed error signal.

9. The engine system of claim 8, wherein the controller further includes:

an exhaust gas temperature (EGT) curve table configured to receive the temperature, the altitude, and the engine speed signal and to generate a target EGT signal based on the ambient temperature, the altitude, and the engine speed signal, a second summing junction module coupled to the EGT curve table and configured to receive the target EGT signal from the dwell table and a measured EGT signal and to compare the target EGT signal and the measured EGT signal to generate an EGT error signal, and a second PI action module coupled to the second summing junction module and configured to receive the EGT error signal and to generate a second torque adjustment command based on the EGT error signal.

10. The engine system of claim 9, wherein the controller further includes:

a selection module coupled to the first PI action module and the second PI action module and configured to select the first torque adjustment command or the second torque adjustment command as the command signal to the starter generator.

11. The engine system of claim 9, wherein the EGT curve table is further configured to receive a level of electrical power available to the starter generator and to generate the target EGT signal further based on the level of electrical power.

12. The engine system of claim 8, wherein the controller is configured to command the starter generator to continue providing the torque to the gas turbine engine beyond a self-sustaining speed.

13. An engine system for starting a gas turbine engine, comprising:

a starter generator coupled to the gas turbine engine and configured to provide torque to the gas turbine engine;

a controller coupled to the starter generator and configured to provide a command signal to the starter generator, the starter generator providing the torque to the gas turbine engine based on the command signal, the controller configured to command the starter generator at a dwell speed until ignition, wherein the controller is configured to command the starter generator to continue providing the torque to the gas turbine engine beyond a self-sustaining speed, wherein the controller is configured to command the starter generator based on a start schedule from an exhaust gas temperature (EGT) curve table, and wherein the EGT curve table is a look up table with inputs of at least the temperature, the altitude, the engine speed signal and a level of electrical power available to the starter generator.

14. The engine system of claim 13, wherein the controller is configured to command the starter generator to continue providing the torque to the gas turbine engine beyond about 80% of engine operating speed.

15. The engine system of claim 13, wherein the controller includes:

a dwell table configured to receive an ambient temperature and an altitude and to generate a target dwell speed signal based on the ambient temperature and the altitude, a first summing junction module coupled to the dwell table and configured to receive the target dwell speed signal from the dwell table and an engine speed signal and to compare the target dwell speed signal and the engine speed signal to generate a speed error signal, and a first proportional integral (PI) action module coupled to the first summing junction module and configured to receive the speed error signal and to generate a first torque adjustment command based on the speed error signal.

16. The engine system of claim 15, wherein the controller further includes:

a second summing junction module coupled to the EGT curve table and configured to receive the target EGT signal from the dwell table and a measured EGT signal and to compare the target EGT signal and the measured EGT signal to generate an EGT error signal, and a second PI action module coupled to the second summing junction module and configured to receive the EGT error signal and to generate a second torque adjustment command based on the EGT error signal.

17. The engine system of claim 16, wherein the controller further includes:

a selection module coupled to the first PI action module and the second PI action module and configured to select the first torque adjustment command or the second torque adjustment command as the command signal to the starter generator.

* * * * *